(12) United States Patent
Kerr

(10) Patent No.: US 11,221,317 B2
(45) Date of Patent: Jan. 11, 2022

(54) DEVELOPMENT CHAMBERS FOR THIN LAYER CHROMATOGRAPHY AND METHODS OF MAKING AND USING THE SAME

(71) Applicant: Sorbent Technologies, Inc., Norcross, GA (US)

(72) Inventor: Robert Ralph Kerr, Alpharetta, GA (US)

(73) Assignee: SORBENT TECHNOLOGIES, INC., Norcross, GA (US)

( * ) Notice: Subject to any disclaimer, the term of this patent is extended or adjusted under 35 U.S.C. 154(b) by 29 days.

(21) Appl. No.: 16/662,534

(22) Filed: Oct. 24, 2019

(65) Prior Publication Data

US 2020/0132643 A1  Apr. 30, 2020

Related U.S. Application Data

(60) Provisional application No. 62/751,972, filed on Oct. 29, 2018.

(51) Int. Cl.
*G01N 30/92* (2006.01)
*G01N 30/94* (2006.01)

(52) U.S. Cl.
CPC .......... *G01N 30/92* (2013.01); *G01N 30/94* (2013.01)

(58) Field of Classification Search
CPC ........ G01N 30/91; G01N 30/92; G01N 30/94; G01N 2030/945; G01N 30/90–94
See application file for complete search history.

(56) References Cited

U.S. PATENT DOCUMENTS

| | | | | |
|---|---|---|---|---|
| 3,214,024 A | * | 10/1965 | Shandon | G01N 27/44756 210/198.3 |
| 3,318,451 A | * | 5/1967 | Przybylowicz | G01N 30/90 210/198.3 |
| 3,327,857 A | * | 6/1967 | Kopp | G01N 30/90 210/198.3 |
| 3,341,017 A | * | 9/1967 | Powell | G01N 30/90 210/94 |
| 3,465,884 A | * | 9/1969 | Matherne, Jr. | G01N 30/92 210/323.1 |
| 3,477,950 A | * | 11/1969 | Clement | G01N 30/90 210/658 |
| 3,629,098 A | * | 12/1971 | Hara | G01N 30/90 210/198.3 |
| 4,306,977 A | * | 12/1981 | Pan | G01N 30/94 210/198.3 |
| 6,709,584 B2 | * | 3/2004 | Guller | G01N 30/91 210/198.3 |

(Continued)

FOREIGN PATENT DOCUMENTS

CN 202 583 148 12/2012
CN 205 506 775 8/2016
(Continued)

OTHER PUBLICATIONS

PCT/US2019/057808 International Search Report and Written Opinion, dated Feb. 3, 2020.

*Primary Examiner* — Ryan B Huang
(74) *Attorney, Agent, or Firm* — Withers & Keys, LLC

(57) ABSTRACT

Development chambers suitable for use in thin layer chromatography are disclosed. Methods of making and using development chambers in thin layer chromatography are also disclosed.

38 Claims, 13 Drawing Sheets

(56) References Cited

U.S. PATENT DOCUMENTS

2019/0391120 A1* 12/2019 Gutmann ............... G01N 30/88

FOREIGN PATENT DOCUMENTS

| CN | 107 315 063 | | 11/2017 | |
|----|----|----|----|----|
| DE | 2814993 | A1 | 10/1979 | |
| EP | 1 000 353 | B1 | 11/2005 | |
| GB | 929578 | A * | 6/1963 | ............. G01N 30/94 |
| GB | 1025103 | A * | 4/1966 | ....... G01N 27/44756 |

* cited by examiner

DEVELOPMENT CHAMBERS FOR THIN LAYER CHROMATOGRAPHY AND METHODS OF MAKING AND USING THE SAME

CROSS-REFERENCE TO RELATED APPLICATIONS

This patent application claims the benefit of priority to U.S. Provisional Patent Application Ser. No. 62/751,972 filed on Oct. 29, 2018 and entitled "DEVELOPMENT CHAMBERS FOR THIN LAYER CHROMATOGRAPHY AND METHODS FOR MAKING AND USING THE SAME," the subject matter of which is hereby incorporated by reference in its entirety.

FIELD OF THE INVENTION

The present invention relates generally to development chambers for thin layer chromatography. The present invention further relates to methods of making and using development chambers for thin layer chromatography.

BACKGROUND OF THE INVENTION

Chromatography was first used in Russia by the Italian-born scientist Mikhail Tsvet in 1903. The mid-20th century saw an explosion of research in new chromatographic techniques, particularly thanks to the work of Archer John Porter Martin and Richard Laurence Millington Synge. Martin and Synge developed partition chromatography to separate chemicals with only slight differences in partition coefficients between two liquid solvents.

The first reported use of a thin layer was in 1938 by two Russian scientists, N. A. Izmailov and M. S. Schreiber. They separated plant extracts on a slurried adsorption medium spread to a 2-mm-thick layer by spotting an alcoholic plant extract in the center of the layer and observing rings as the solution spread. This work was reviewed in 1941 by M. O'L Crowe, who reported that he and his colleagues had been using a thin layer of adsorbent in a petri dish and had achieved similar results. The fledgling technique was then improved by the addition of binders to the sorbents. This was first reported in Analytical Chemistry by J. E. Meinhard and N. F. Hall in 1949.

At about the same time, J. G. Kirchner and his colleagues at the U.S. Department of Agriculture were working to determine the chemistry of orange and grapefruit flavors. One day, when one of Kirchner's colleagues was frustrated about a difficult separation, Kirchner reached across his desk, picked up the abstract of Meinhard and Hall's work, and said, "Try this". Kirchner and his team found that silicic acid bound with amioca starch created a satisfactory layer for TLC. He continued his work with sorbent layers on glass plates and developed TLC essentially as we know it today. Kirchner also observed that in order to obtain reproducible results, conditions had to be standardized.

TLC soon grew in popularity, while further advances continued. Instrumentation was developed to permit more precise spotting of samples onto plates and quantitative evaluation of the separated spots. Improvements in the technique itself resulted in higher separation power and faster analysis. To emphasize the significant change in performance, the improved TLC was named "high-performance thin-layer chromatography" (HPTLC) by R. E. Kaiser, who was instrumental in its development. The main difference between conventional and high-performance TLC was in the particle size and range of the adsorbent.

Another major breakthrough came in the 1960s when convenient pre-coated plates became commercially available. Perhaps more than any other scientist, Egon Stahl advanced the technique of thin-layer chromatography. In 1958, the "silica gel plates according to Stahl for TLC" were manufactured by Merck KGaA, Darmstadt, Germany. By 1962 so many papers had been published about the method that Stahl edited the first laboratory handbook on TLC. In the mid-1960s, the first instruments were developed for scanning densitometry using absorbance or fluorescence measurements in the reflectance or transmission mode. The commercial production of HPTLC plates in the mid-1970s provided further impetus for improvements in practice and instrumentation.

This layer chromatography (TLC) consists of several elements including (1) a thin layer plate comprising adsorbent (e.g., Silica, Alumina, Polyamide, and other materials) (also referred to as "the stationary phase" on a support (e.g., Glass, Aluminum, Plastic (polyester)), (2) a development chamber with lid and chamber body, (3) a development liquid (also called "the mobile phase"), and (4) a sample (applied to the TLC plate approximately 1 cm from the bottom). An exemplary TLC system is shown in FIG. 1.

As shown in FIG. 1, a typical TLC system 10 comprises: a thin layer plate 11 comprising adsorbent 12 (e.g., Silica, Alumina, Polyamide, and other materials)(also referred to as "the stationary phase" on a support 13 (e.g., Glass, Aluminum, Plastic (polyester)), positioned within a development chamber 14 with lid 15 and chamber body 16, and a development liquid 17 (also called "the mobile phase" or "solvent") within a reservoir 18 of the development chamber 14. The TLC system 10 also comprises a sample 19, applied onto the TLC plate 11 approximately 1 cm from a bottom 111 of the TLC plate 11.

The process steps for performing TLC are as follows:

1. A sample is applied to the adsorbent layer (i.e., the stationary phase) on the TLC plate approximately 1 cm from the bottom.
2. The mobile phase (e.g., solvent) is added to the bottom of the development chamber forming a reservoir such that the depth of the reservoir is approximately 0.6 cm.
3. The plate is placed in the development chamber.
4. The lid (top) of the development chamber is added.
5. The mobile phase (e.g., solvent) is drawn up from the reservoir through the adsorbent (i.e., the stationary phase).
6. When the solvent front is near the top of the plate, the TLC plate is removed from the development chamber.
7. The TLC plate is dried out and the separation visualized by one of several available methods.
8. Once the separation is visualized, the $R_f$ (retardation factor) of all the substances can be calculated and compared with previous separations.

At Step 6, the plate must be removed from the chamber before the solvent front reaches the top. If the solvent front runs over, then the $R_f$ values are not comparable to previous runs. Due to evaporation of solvent from the plate, the solvent and the different substances in the solvent keep moving towards the top, which changes the $R_f$ values relative to the origin. This means, that the worker must stay in front of the developing plate and not leave such that the plate can be pulled out at the right time.

FIGS. 2-3 show known development chambers 14. As shown in FIGS. 2-3, TLC plates 11 are positioned so that bottom 111 of each TLC plate 11 extends along a bottom surface 21 of each of the development chambers 14 and leans against an inner wall surface 22 within development liquid/solvent 17. See, in particular, FIG. 3.

Known development chambers require a minimum amount of mobile phase volume in order to effectively perform TLC. Important quantities to consider for TLC include (1) the density of silica gel on a TLC plate is 0.5±0.1 g/cc.

(2) common silica gel plate thickness is 0.200 or 0.250 mm (200 μm to 250 μm).

(3) the pore volume for silica gel is 1.0±0.1 ml/g.

(4) the interstitial volume for silica gel is ~40% of the volume occupied by the silica gel.

(5) evaporation volume is an experimentally determined value for TLC and is usually about 15% of the volume that fills the silica gel on the plate.

Typically, known TLC plates come in two sizes: (1) a large version having a length of 20 cm, a width of 20 cm, and a silica layer height (thickness) of 0.025 cm, and (2) a smaller version having a length of 7.5 cm, a width of 2.5 cm, and a height of 0.025 cm. Calculations of the volume of solvent needed for each of the TLC plates are shown in the Table below.

Calculations of the Volume Requirement of Different Sizes of TLC Plates

|  |  | Large TLC Plate | | Small TLC Plate | |
| --- | --- | --- | --- | --- | --- |
| Length | cm | 20 | 20 | 10 | 7.5 |
| Width | cm | 20 | 10 | 5 | 2.5 |
| Height | cm | 0.025 | 0.025 | 0.025 | 0.025 |
| Volume of Adsorbent | cc | 10.00 | 5.00 | 1.25 | 0.47 |
| Silica Gel Density | g/cc | 0.5 | 0.5 | 0.5 | 0.5 |
| Weight of Silica | cc | 5.00 | 2.50 | 0.63 | 0.23 |
| Pore Volume | cc | 5.00 | 2.50 | 0.63 | 0.23 |
| Interstitial Volume | cc | 4.00 | 2.00 | 0.50 | 0.19 |
| Total Liquid Volume | cc | 9.00 | 4.50 | 1.13 | 0.42 |
| Evaporation Volume | cc | 1.35 | 0.68 | 0.17 | 0.06 |
| Total Mobile Phase Volume Required for development | cc | 10.35 | 5.18 | 1.29 | 0.49 |

From the calculations above, the amount of solvent needed for use with known TLC plates is significantly less than the reservoirs (i.e., the volume of reservoirs) of known development chambers. For a small plate, 2.5 cm×7.5 cm, approximately 0.5 ml of solvent is required—yet the solvent reservoir of known TLC development chambers for use with small TLC plates contains 12 ml of solvent—approximately 25 times that which is needed. For a large plate, approximately 10 ml of solvent is required yet the solvent reservoir contains about 120 ml of solvent—approximately 12 times that which is needed.

There is a need in the art for improved TLC development chambers that utilize less solvent compared to known TLC development chambers.

SUMMARY OF THE INVENTION

The present invention is directed to new TLC development chambers that utilize a minimal amount of solvent during a TLC procedure. The disclosed TLC development chambers provide a relative small solvent reservoir, while enabling unobstructed absorption of solvent along a TLC plate.

In some embodiments of the present invention, the development chamber comprises a chamber base member having a base member upper surface, wherein the base member upper surface of the chamber base member comprises a well extending below the base member upper surface, the well having (a) well dimensions that (i) enable a bottom end of a thin layer chromatography (TLC) plate to be positioned therein, and (ii) house at leak a portion of a mobile phase/solvent when inputted into the well, and (b) a maximum well cross-sectional area $W_A$ that is less than 80% of a maximum interior cross-sectional area of a chamber body extending substantially parallel with an open end of the chamber body, the chamber body sized to extend above the chamber base member such that one or more inner wall surfaces of the chamber body and the base member upper surface of the chamber base member at least partially surround a chamber volume of the development chamber when used in combination. The well may have a maximum well cross-sectional area $W_A$ that is less than 80% (or any value less than 80%, including 80%, in increments of 0.1%, for example, less than 10.2%, or any range of values less than 80%, including 80%, in increments of 0.1%, for example, from about 1.04% to about 20.9%) of a maximum interior cross-sectional area of a chamber body extending substantially parallel with an open end of the chamber body, the chamber body sized to extend above the chamber base member such that one or more inner wall surfaces of the chamber body and the base member upper surface of the chamber base member at least partially surround a chamber volume of the development chamber when used in combination.

In other embodiments of the present invention, the development chamber comprises a chamber base member having a base member upper surface; and a chamber body that extends above the chamber base member such that one or more inner wall surfaces of the chamber body and the base member upper surface of the chamber base member at least partially surround a chamber volume of the development chamber, wherein the base member upper surface of the chamber base member comprises a well extending below and into the base member upper surface, the well having (a) well dimensions that (i) enable a bottom end of a thin layer chromatography (TLC) plate to be positioned therein, and (ii) house at least a portion of a mobile phase/solvent when inputted into the well, and (b) a maximum well cross-sectional area $W_A$ that is less than 80% of a maximum interior cross-sectional area of the chamber body at an open end of the chamber body.

In other embodiments of the present invention, the development chamber comprises a chamber base member having a base member upper surface; and a chamber body that extends above the chamber base member such that one or more inner wall surfaces of the chamber body and the base member upper surface of the chamber base member at least partially surround a chamber volume of the development chamber, wherein the base member upper surface of the chamber base member comprises a well extending below and into the base member upper surface, the well having (a) well dimensions that (i) enable a bottom end of a thin layer chromatography (TLC) plate to be positioned therein, and (ii) house at least a portion of a mobile phase/solvent when inputted into the well, and (b) a well volume $W_V$ of less than 10.0 cubic centimeters (cc). The well may have a well volume $W_V$ of less than 10.0 cc (or any value less than 10.0 cc, including 10.0 cc, in increments of 0.1 cc, for example, less than 4.8 cc, or any range of values less than 10.0 cc, including 10.0 cc, in increments of 0.1 cc, for example, from about 3.4 cc to about 6.0 cc).

The present invention is further directed to methods of making the new TLC development chambers. In some embodiments, the method of making a TLC development chamber comprises forming a chamber base member having a base member upper surface, wherein the base member upper surface of the chamber base member comprises a well extending below the base member upper surface, the well having well dimensions that (i) enable a bottom end of a TLC plate to be positioned therein, and (ii) house at least a portion of a mobile phase/solvent when inputted into the well. Methods of making the new TLC development chambers of the present invention may further comprise a number of additional steps including, but not limited to, forming a chamber body that extends above the chamber base member such that one or more inner wall surfaces of the chamber body and the base member upper surface of the chamber base member at least partially surround (or in some embodiments, completely surrounds) a chamber volume of the development chamber.

The present invention is even further directed to methods of using the new TLC development chambers. In some embodiments, the method of using a TLC development chamber comprises positioning a thin layer chromatography (TLC) plate within a well of a chamber base member so that the TLC plate extends upward and out of the well, the well extending below a base member upper surface, and having well dimensions that (i) enable a bottom end of a TLC plate to be positioned therein, and (ii) house at least a portion of a mobile phase/solvent when inputted into the well. Methods of using the new TLC development chambers of the present invention may further comprise a number of additional steps including, but not limited to, inputting a solvent into the well of the chamber base member; and positioning a chamber body over the chamber base member and the TLC plate so that one or more inner wall surfaces of the chamber body and the base member upper surface of the chamber base member at least partially surround a chamber volume of the development chamber and the TLC plate positioned within the development chamber. The disclosed methods of using the new TLC development chambers provide a cost-effective and environmentally friendly method of performing a TLC procedure while minimizing waste solvent.

These and other features and advantages of the present invention will become apparent after a review of the following detailed description of the disclosed embodiments and the appended claims.

BRIEF DESCRIPTION OF THE FIGURES

The present invention is further described with reference to the appended figure, wherein.

DETAILED DESCRIPTION OF THE INVENTION

Figure 1:
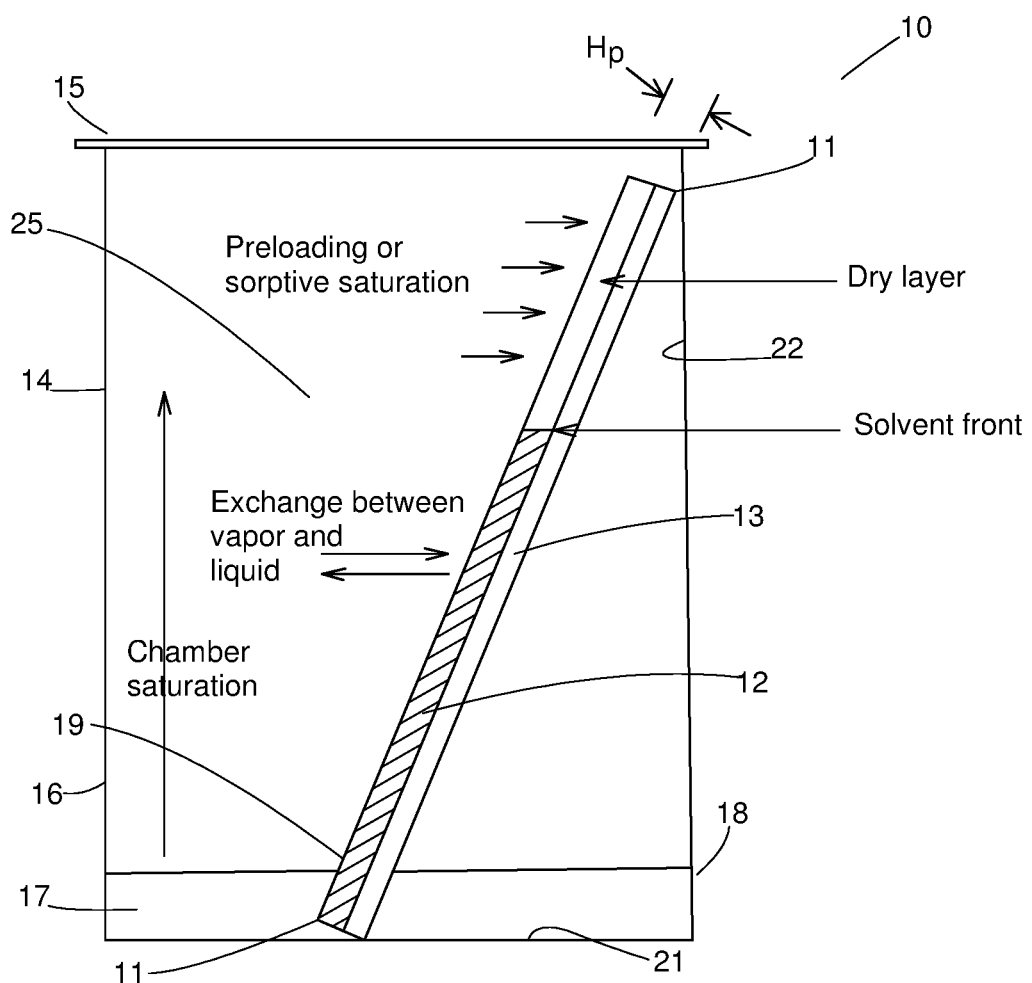
FIG. 1 (prior art) depicts a known development chamber system suitable for use in a thin layer chromatography process.
Figure 2:
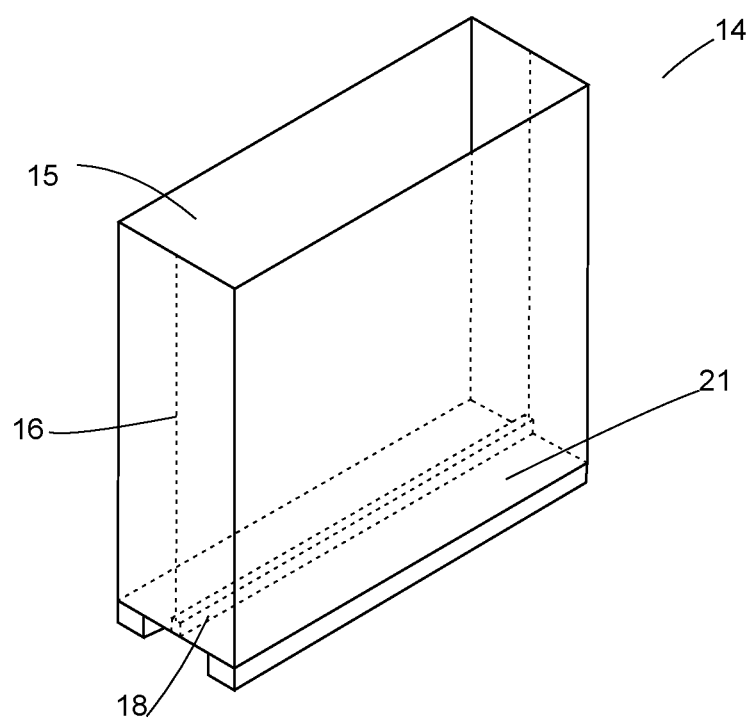
FIG. 2 (prior art) depicts a known, large development chamber (20 cm×20 cm) used in a thin layer chromatography process.
Figure 3:
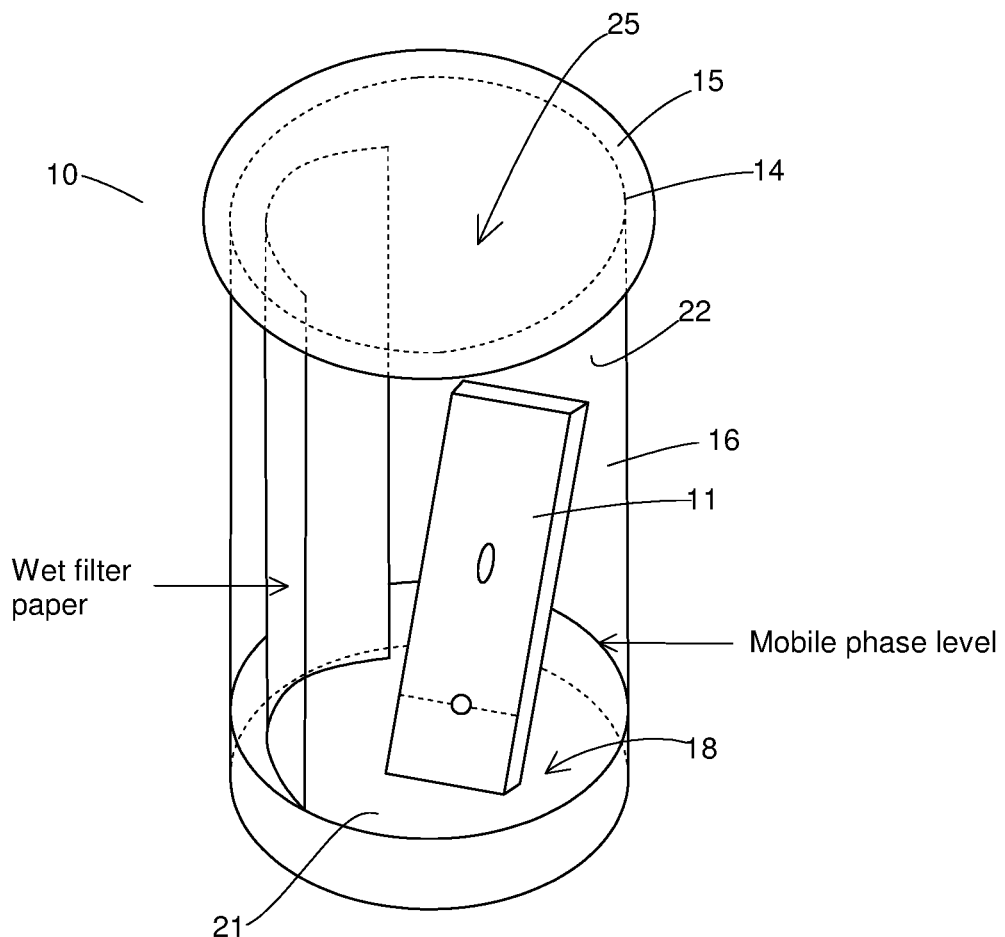
FIG. 3 (prior art) depicts a known, small development chamber (5 cm×9 cm) used in a thin layer chromatography process.
Figure 4A:
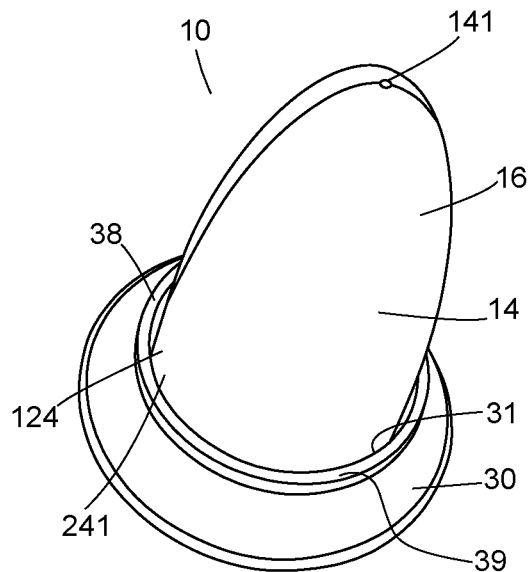
FIGS. 4A-4F depict various views of an exemplary development chamber assembly of the present invention.
Figure 4B:
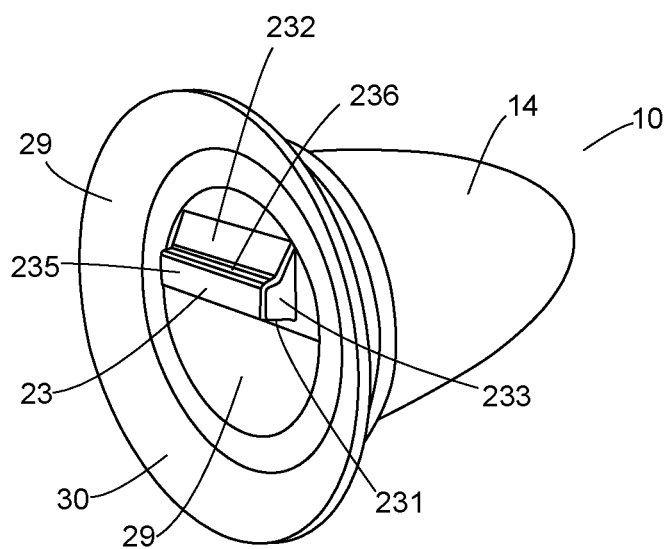
Figure 4C:
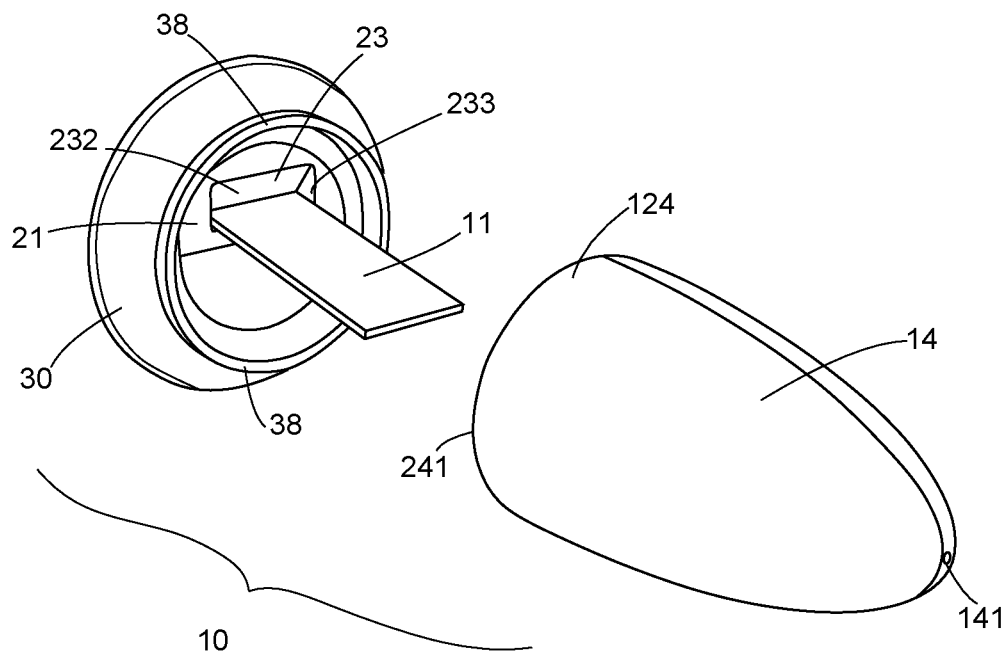
Figure 4D:
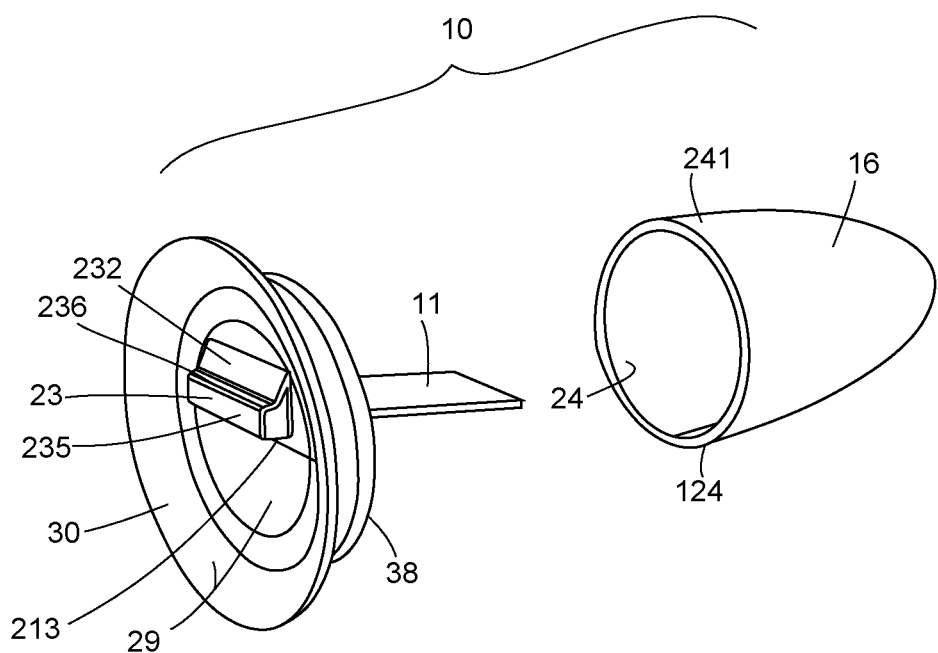
Figure 4E:
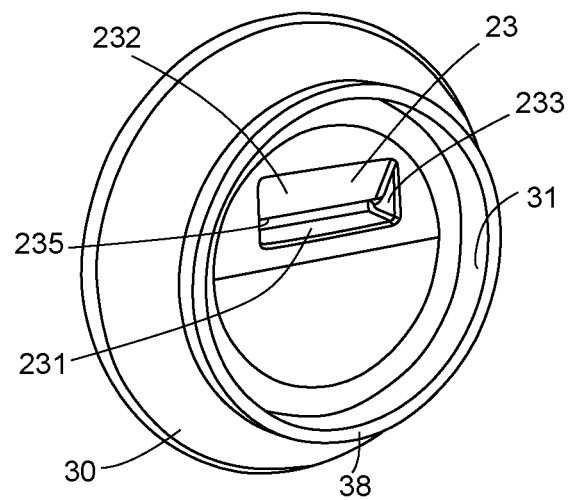
Figure 4F:
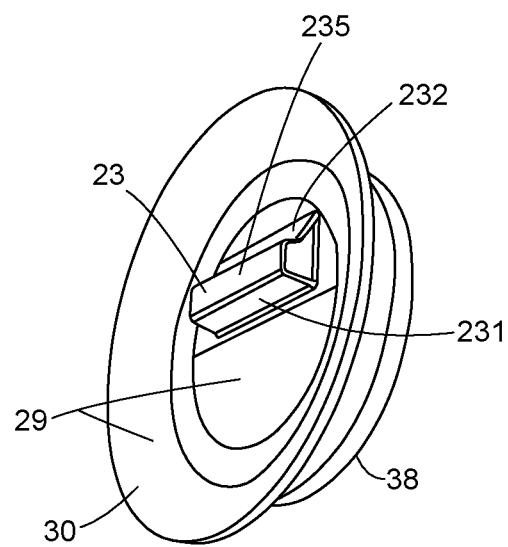
Figure 5:
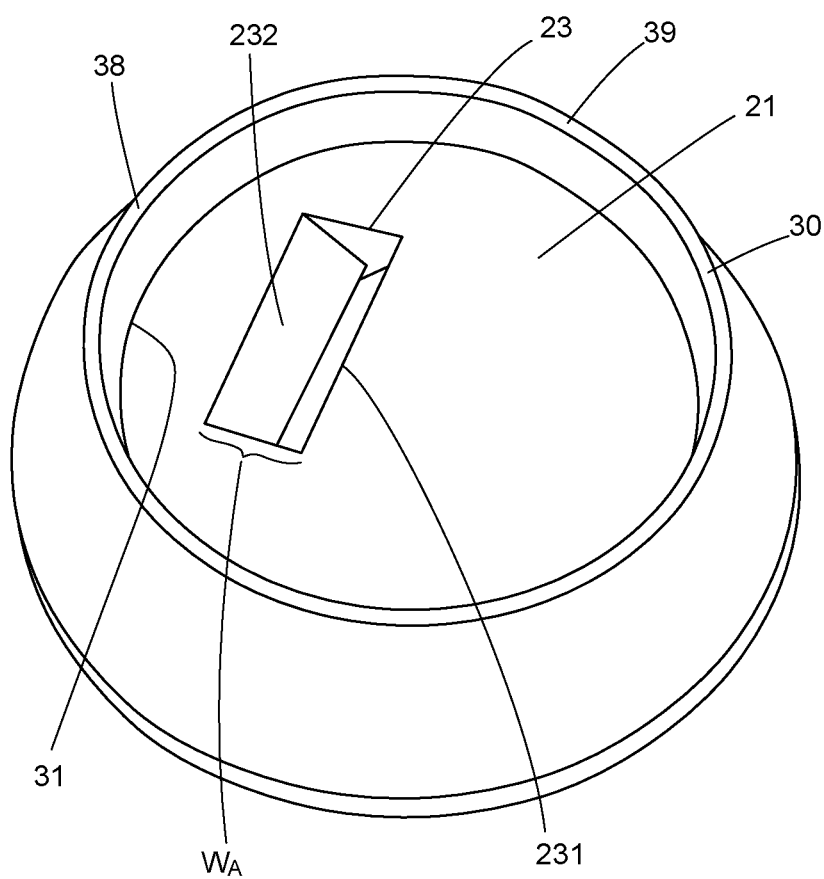
FIG. 5 depicts an exemplary base member of the exemplary development chamber assembly shown in FIGS. 4A-4F.
Figure 6A:
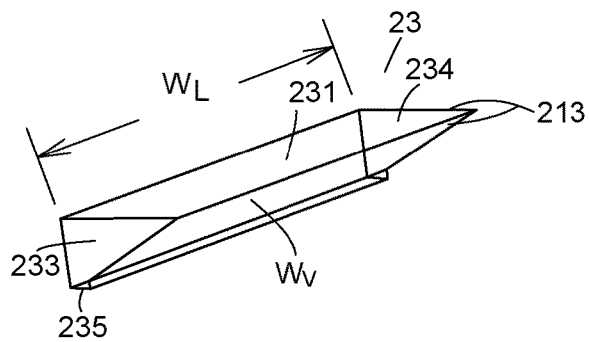
FIGS. 6A-6D various views of an exemplary well within the exemplary base member shown in FIG. 5.
Figure 6B:
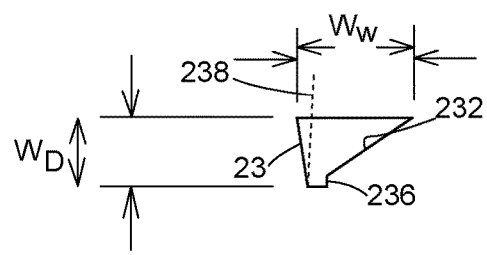
Figure 6C:
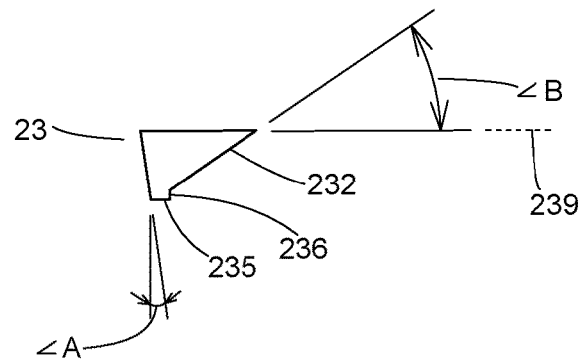
Figure 6D:
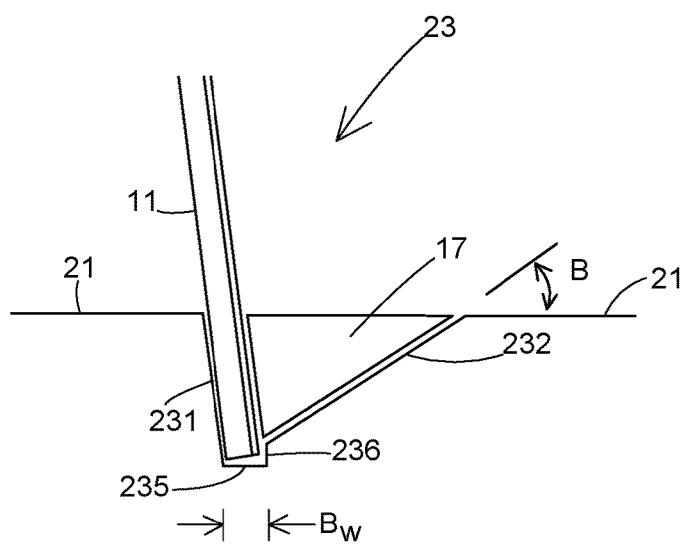

The present invention is directed to development chambers for thin layer chromatography that utilize a reduced amount of solvent. The present invention is further directed to methods of making and using development chambers for thin layer chromatography that utilize a reduced amount of solvent.

I. Development Chambers for Thin Layer Chromatography

The present invention is directed to development chambers for thin layer chromatography that utilize a reduced amount of solvent. Exemplary development chamber assemblies and assembly components of the present invention are shown in FIGS. 4A-9. As shown in FIGS. 4A-6D, a first exemplary development chamber 14 comprises: (I) a chamber base member 30 having a base member upper surface 21; and (II) a chamber body 16 that extends above chamber base member 30 such that (i) one or more inner wall surfaces 22 of chamber body 16 and (ii) base member upper surface 21 of chamber base member 30 at least partially surround a chamber volume 25 of the development chamber 14. As shown in FIGS. 4B-6D, base member upper surface 21 of chamber base member 30 comprises a well 23 extending below and into base member upper surface 21. Well 23 has (a) well dimensions that (i) enable a bottom end 111 of a thin layer chromatography (TLC) plate 11 to be positioned therein, and (ii) house at least a portion (or all) of a mobile phase/solvent 17 (i.e., used during a TLC procedure) when inputted into well 23, and (b) a maximum well cross-sectional area $W_A$ that is less than 80% of a maximum interior cross-sectional area of chamber body 16 extending substantially parallel with an open end 124 of chamber body 16.

As used herein, the phrase "a base member upper surface 21" is used to identify all surface portions of base member 30 that surround well 23. As shown, for example, in exemplary base member 30 shown in FIG. 5, base member upper surface 21 completely surrounds well 23 and a majority of the total surface area of base member upper surface 21 is within a horizontally-extending plane. Although exemplary base member 30 shown in FIG. 5 has a rim 39 extending around the outer perimeter of exemplary base member 30, upper surface portions along rim 39 contribute little to the overall surface area of base member upper surface 21.

Figure 7:
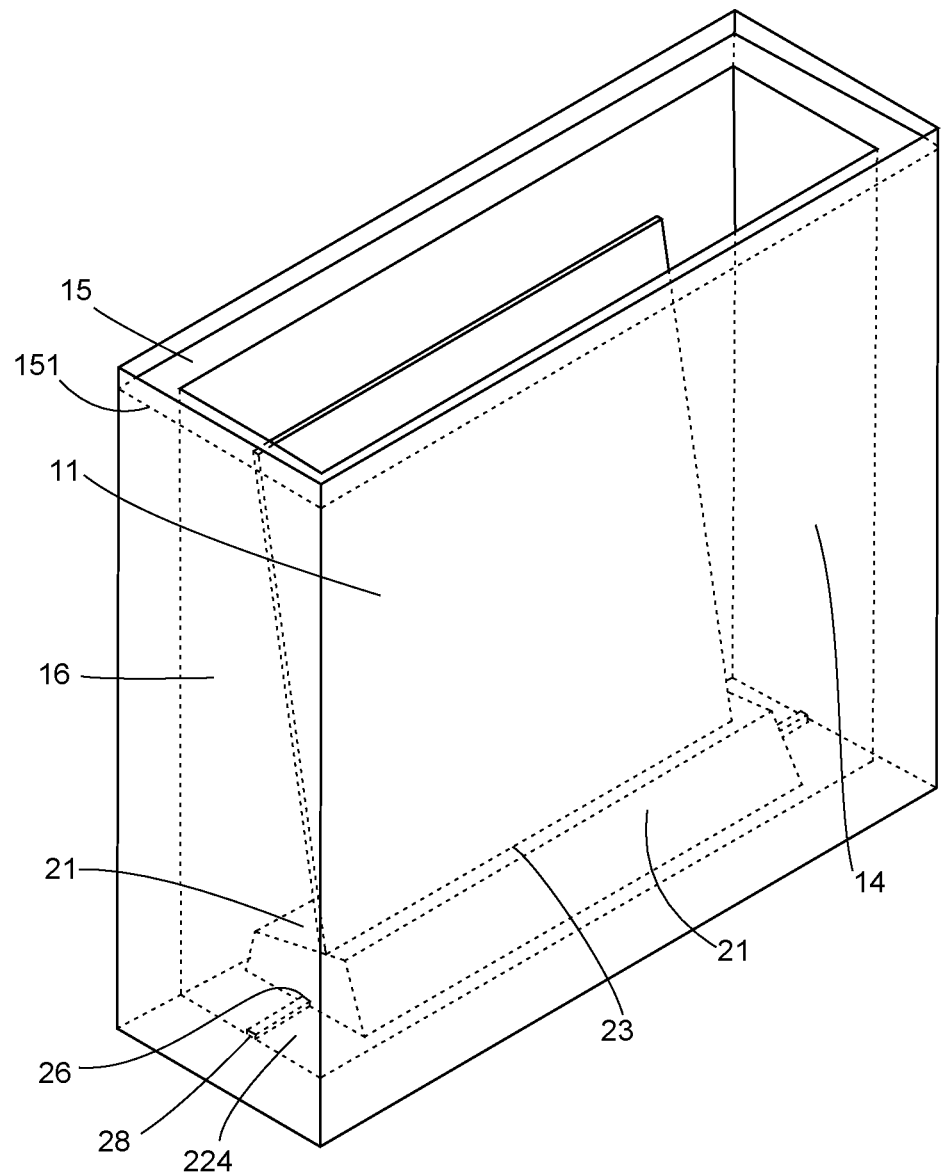
FIG. 7 depicts another exemplary development chamber assembly of the present invention.
Figure 8:
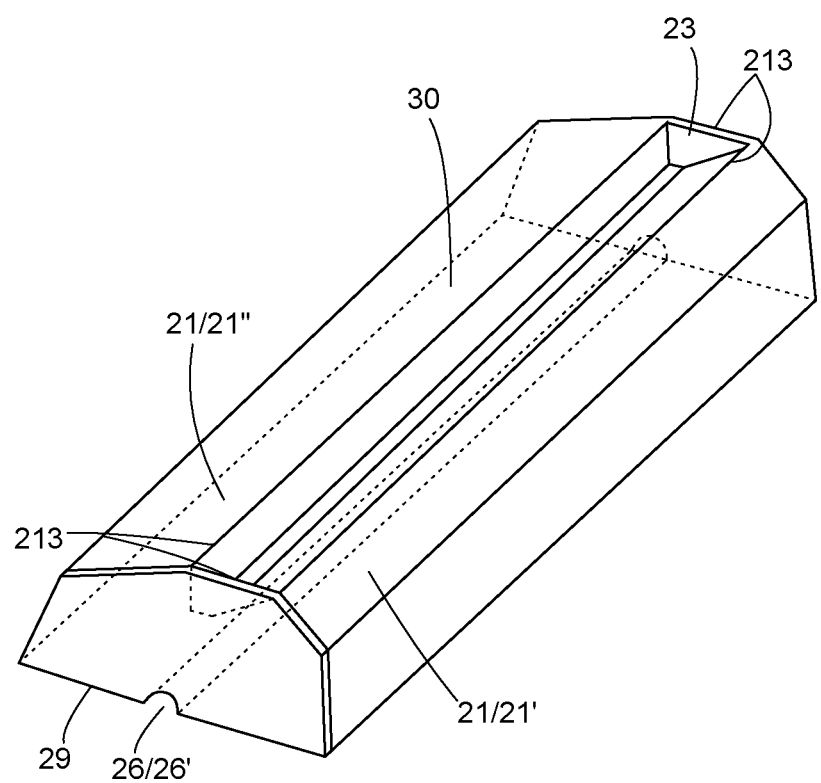
FIG. 8 depicts an exemplary base member of the exemplary development chamber assembly shown in FIG. 7.
Figure 9:
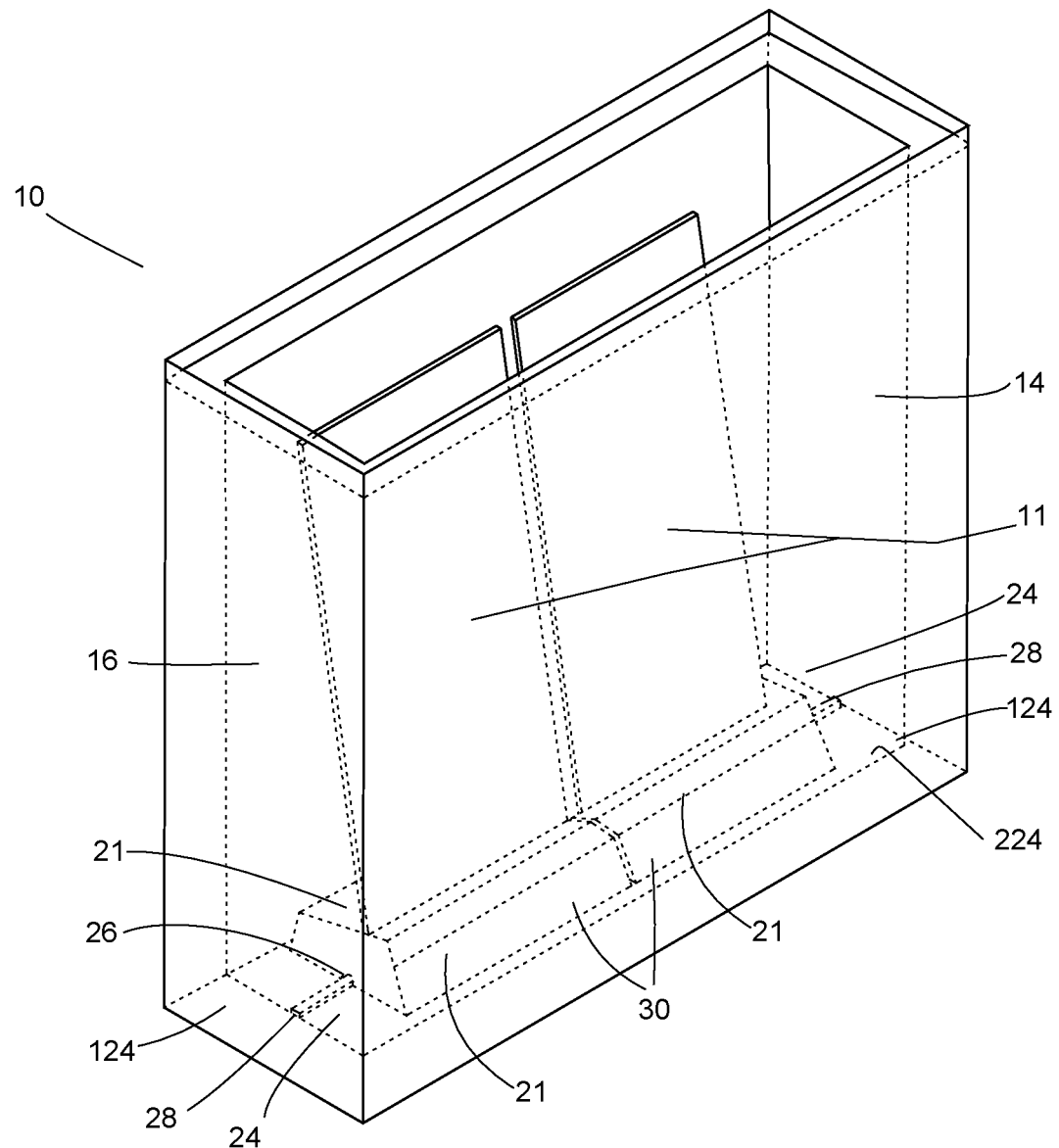
FIG. 9 depicts exemplary base members positioned within the exemplary development chamber assembly shown in FIG. 7.
Figure 10:
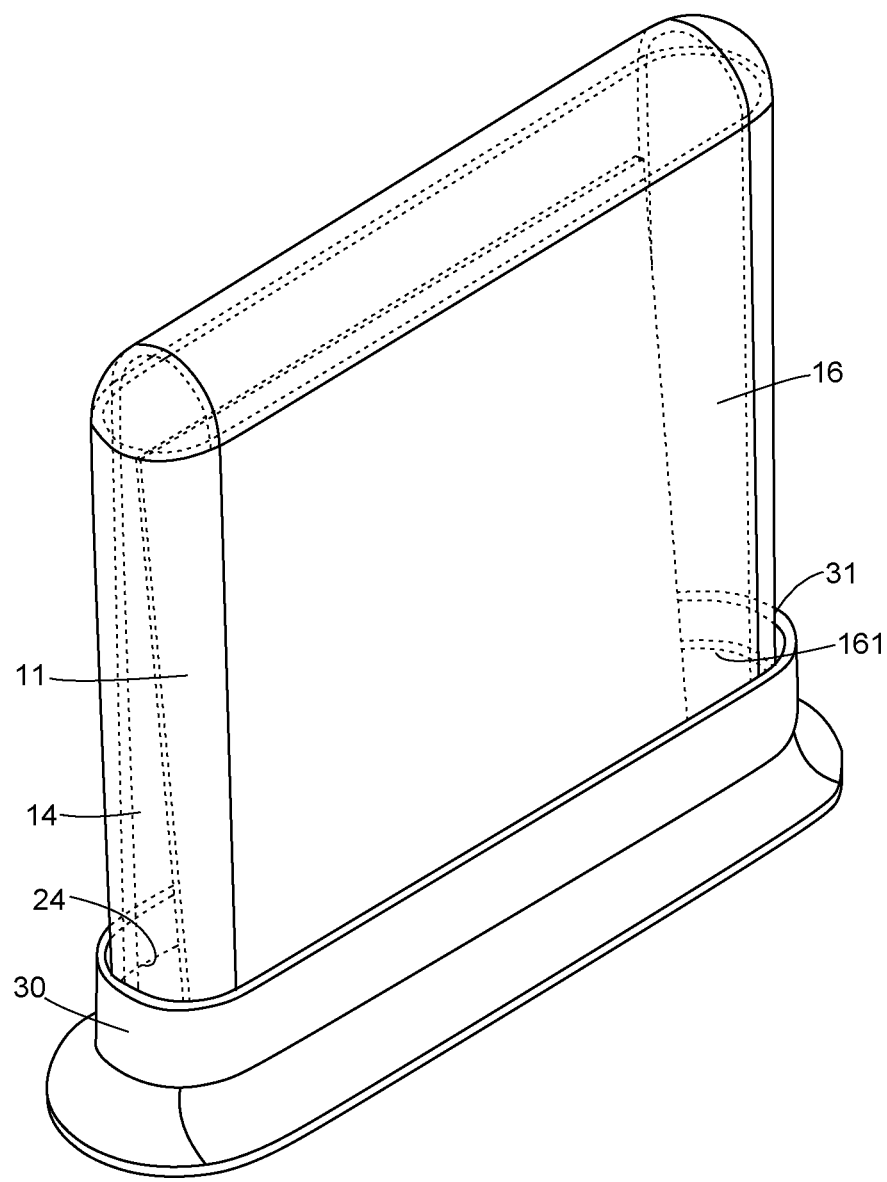
FIG. 10 depicts another exemplary development chamber assembly of the present invention.
Figure 11:
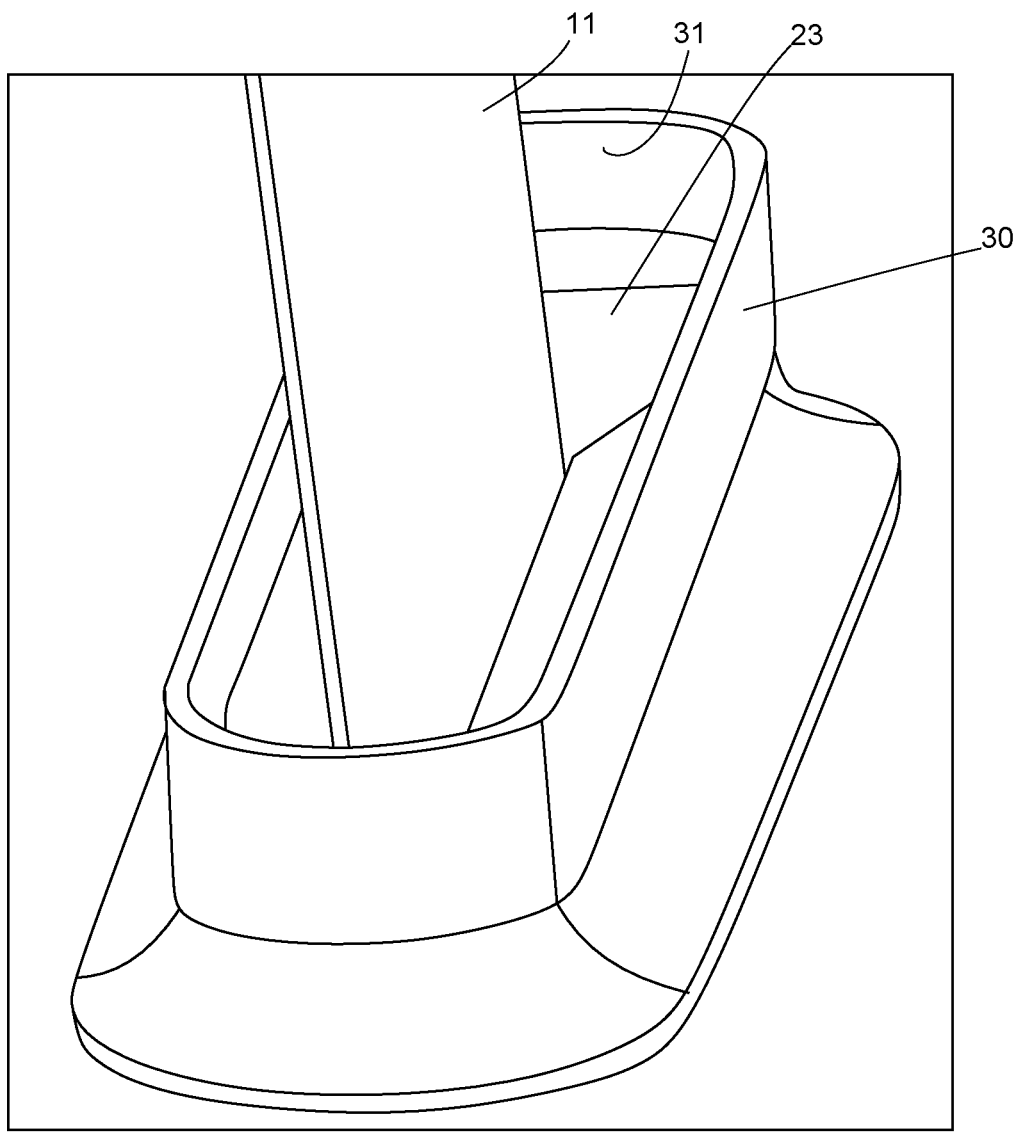
FIG. 11 depicts an exemplary base member of the exemplary development chamber assembly shown in FIG. 10.

In other embodiments shown in FIGS. 7-9, exemplary base member 30 has a base member upper surface 21 that completely surrounds well 23 and a majority of the total surface area of base member upper surface 21 extends along opposite sides of well 23. These base member upper surface portions 21' and 21" are not within a single horizontally-extending plane (although they could be), but instead are within two separate horizontally-extending planes, each of which independently forms an acute angle with an upper edge 213 of well 23.

As discussed herein, well 23 may have a maximum well cross-sectional area $W_A$ that is less than 80% (or any value less than 80%, including 80%, in increments of 0.1%, for example, less than 10.2%, or any range of values less than 80%, including 80%, in increments of 0.1%, for example, from about 10.4% to about 20.9%) of a maximum interior cross-sectional area of chamber body 16 extending substantially parallel with an open end 124 of chamber body 16. For example, see open end 124 of exemplary chamber body 16 shown in FIG. 4D or see open end 124 of exemplary chamber body 16 shown in FIG. 9.

Typically, well 23 will comprise two or more well walls that bound a well volume $W_V$. In addition, typically, well 23 will comprises one or more well walls that extend into and at a 90° angle to chamber base upper surface 21. As shown in FIGS. 4B-6D, exemplary well 23 comprises (i) a rear well wall 231 extending along a well length $W_L$, (ii) a front well wall 232 extending along the well length $W_L$ opposite the rear well wall 231, (iii) opposing side well walls 233/234 extending between rear well wall 231 and front well wall 232 (and at a 90° angle to chamber base upper surface 21), (iv) a bottom well wall 235 extending outward from rear well wall 231 towards front well wall 232, and (v) a front well wall extension 236 extending along the well length $W_L$ opposite rear well wall 231 and downward from front well wall 232 (and at a 90° angle to chamber base upper surface 21) so as to intersect with bottom well wall 235.

The development chamber assemblies 14 and assembly components 16/30 of the present invention, with well 23, enable thin layer chromatography (TLC) procedures to be performed while utilizing a minimum amount of solvent 17. As discussed herein, the development chamber assemblies 14 and assembly components 16/30 of the present invention, with well 23, enable thin layer chromatography (TLC) procedures to be performed while utilizing less than about 10 milliliters (ml) (or any value less than 10.0 ml, including 10.0 ml, in increments of 0.1 ml, for example, less than 2.8 ml, or any range of values less than 10.0 ml, including 10.0 ml, in increments of 0.1 ml, for example, from about 0.4 ml to about 3.0 ml) of solvent 17 (i.e., to at least partially fill well 23 of the chamber base member 30). In many cases, the development chamber assemblies 14 and assembly components 16/30 of the present invention, with well 23, enable thin layer chromatography (TLC) procedures to be performed while utilizing utilizes less than about 5.0 ml (or any value less than 5.0 ml, including 5.0 ml, in increments of 0.1 ml, for example, less than 2.6 ml, or any range of values less than 5.0 ml, including 5.0 ml, in increments of 0.1 ml, for example, from about 0.5 ml to about 1.0 ml) of solvent 17 for a thin layer chromatography (TLC) procedure (i.e., to at least partially fill well 23 of the chamber base member 30).

II. Methods of Making Development Chambers for Thin Layer Chromatography

The present invention is also directed to methods of making development chambers and development chamber components for thin layer chromatography (TLC) procedures. The methods of making development chambers and development chamber components for thin layer chromatography (TLC) procedures comprise methods of making any of the herein-described development chambers 14 (or any components therein, e.g., the chamber base member 30, chamber body 16, etc.).

The methods of making development chamber components may comprise: forming a chamber base member 30 having base member upper surface 21, wherein the base member upper surface 21 of the chamber base member 30 comprises a well 23 extending below and into the base member upper surface 21, the well 23 having well dimensions that (i) enable a bottom end 111 of a thin layer chromatography (TLC) plate 11 to be positioned therein, and (ii) house at least a portion of (or all of) a mobile phase/solvent 17 (i.e., used during a TLC procedure) when inputted into the well. Methods of making development chamber components may further comprise: forming a chamber body 16 that extends above the chamber base member 30 such that one or more inner wall surfaces 22 of the chamber body 16 and the base member upper surface 21 of the chamber base member 30 at least partially surround a chamber volume 25 of the development chamber 14.

Any of the herein described development chambers 14 (or any components therein, e.g., the chamber base member 30, chamber body 16, etc.) may be formed using conventional techniques including, but not limited to, a molding step, a 3D-printing step, a machining step, a finishing step (e.g., applying protective coating), or any combination thereof.

III. Methods of Using Development Chambers for Thin Layer Chromatography

The present invention is also directed to methods of using development chambers for thin layer chromatography, wherein a reduced amount of solvent is used. The methods of using development chambers for thin layer chromatography of the present invention may comprise using any of the herein described development chambers 14, wherein the method comprises: positioning a thin layer chromatography (TLC) plate 11 within a well 23 of a chamber base member 30 so that the TLC plate 11 extends upward and out of the well 23. The methods of using development chambers for thin layer chromatography of the present invention may further comprise one or more of the following steps: inputting a solvent 17 into the well 23 of the chamber base member 30; positioning a chamber body 16 over the chamber base member 30 and the TLC plate 11 so that one or more inner wall surfaces 22 of the chamber body 16 and the base member upper surface 21 of the chamber base member 30 at least partially surround a chamber volume 25 of the development chamber 14 and the TLC plate 11 positioned within the development chamber 14; aligning one or more positioning elements 26 along a lower base member surface 29 of the chamber base member 30 with one or more corresponding positioning elements 36 positioned along an upper inner surface 224 of said chamber body 16; lowering the chamber base member 30 onto the one or more corresponding positioning elements 36; placing a chamber lid 15 onto an upper edge 151 of the chamber body 16 so as to enclose the chamber volume 25 within the TLC plate 11 therein; or any combination thereof.

The methods of using development chambers for thin layer chromatography of the present invention typically utilize less than about 10 milliliters (ml) of solvent 17 for a thin layer chromatography (TLC) procedure (i.e., to at least partially fill, or completely fill, well 23 of the chamber base member 30). As discussed herein, in some embodiments, the methods of using development chambers for thin layer chromatography of the present invention utilize less than about 5.0 ml of solvent 17 for a thin layer chromatography (TLC) procedure (i.e., to at least partially fill well 23 of the chamber base member 30).

The present invention will be further described in the following additional embodiments, examples, and claims.

Additional Embodiments

Development Chambers for Thin Layer Chromatography

1. A development chamber 14 comprising: a chamber base member 30 having a base member upper surface 21; and a chamber body 16 that extends above said chamber base member 30 such that one or more inner wall surfaces 22 of said chamber body 16 and said base member upper surface 21 of said chamber base member 30 at least partially surround a chamber volume 25 of said development chamber 14, wherein said base member upper surface 21 of said chamber base member 30 comprises a well 23 extending below and into said base member upper surface 21, said well 23 having (a) well dimensions that (i) enable a bottom end 111 of a thin layer chromatography (TLC) plate 11 to be positioned therein, and (ii) house at least a portion of a mobile phase/solvent 17 when inputted into said well 23, and (b) a maximum well cross-sectional area $W_A$ that is less than 80% of a maximum interior cross-sectional area of said chamber body 16 extending substantially parallel with an open end 124 of said chamber body 16. Well 23 may have a maximum well cross-sectional area $W_A$ that is less than 80% (or any value less than 80%, including 80%, in increments of 0.1%, for example, less than 10.2%, or any range of values less than 80%, including 80%, in increments of 0.1%, for example, from about 10.4% to about 20.9%) of a maximum interior cross-sectional area of said chamber body 16 extending substantially parallel with an open end 124 of said chamber body 16.

2. A development chamber 14 comprising: a chamber base member 30 having a base member upper surface 21; and a chamber body 16 that extends above said chamber base member 30 such that one or more inner wall surfaces 22 of said chamber body 16 and said base member upper surface 21 of said chamber base member 30 at least partially surround a chamber volume 25 of said development chamber 14, wherein said base member upper surface 21 of said chamber base member 30 comprises a well 23 extending below and into said base member upper surface 21, said well 23 having (a) well dimensions that (i) enable a bottom end 111 of a thin layer chromatography (TLC) plate 11 to be positioned therein, and (ii) house at least a portion of a mobile phase/solvent 17 when inputted into said well 23, and (b) a well volume $W_V$ of less than 10.0 cubic centimeters (cc). Well 23 may have a well volume $W_V$ of less than 10.0 cc (or any value less than 10.0 cc, including 10.0 cc, in increments of 0.1 cc, for example, less than 4.8 cc, or any range of values less than 10.0 cc, including 10.0 cc, in increments of 0.1 cc, for example, from about 3.4 cc to about 6.0 cc).

3. A development chamber 14 comprising: a chamber base member 30 having a base member upper surface 21, wherein said base member upper surface 21 of said chamber base member 30 comprises a well 23 extending below said base member upper surface 21, said well 23 having (a) well dimensions that (i) enable a bottom end 111 of a thin layer chromatography (TLC) plate 11 to be positioned therein, and (ii) house at least a portion of a mobile phase/solvent 17 when inputted into said well 23, and (b) a maximum well cross-sectional area $W_A$ that is less than 80% of a maximum interior cross-sectional area of a chamber body 16 at an open end of a chamber body, the chamber body sized to extend above the chamber base member such that one or more inner wall surfaces of the chamber body and the base member upper surface of the chamber base member at least partially surround a chamber volume of the development chamber when used in combination. As discussed above, well 23 may have a maximum well cross-sectional area $W_A$ that is less than 80% (or any value less than 80%, including 80%, in increments of 0.1%, for example, less than 10.2%, or any range of values less than 80%, including 80%, in increments of 0.1%, for example, from about 10.4% to about 20.9%) of a maximum interior cross-sectional area of said chamber body 16 extending substantially parallel with (i) said maximum well cross-sectional area $W_A$ and (ii) said base member upper surface 21.

4. The development chamber 14 of embodiment 1 or 2, wherein said one or more inner wall surfaces 22 of said chamber body 16 and said base member upper surface 21 of said chamber base member 30 completely surround said chamber volume 25 of said development chamber 14 except for one or more possible (i.e., optional) vent holes 141 extending through chamber body 16. See, for example, FIGS. 4A and 4C.

5. The development chamber 14 of embodiment 3, further comprising: a chamber body 16 that extends above said chamber base member 30 such that one or more inner wall surfaces 22 of said chamber body 16 and said base member upper surface 21 of said chamber base member 30 at least partially surround a chamber volume 25 of said development chamber 14.

6. The development chamber 14 of embodiment 5, wherein said chamber body 16 also extends below at least a portion of (or all of) said chamber base member 30 such that said chamber base member 30 is positioned along a lower inner surface 24 of said chamber body 16. See, for example, exemplary development chamber 14 shown in FIG. 7, wherein chamber base member 30 is positioned within a conventional chamber body 16, and the footprint of chamber base member 30 is much smaller than the area encompassed by the conventional chamber body 16, resulting in upper inner surface 224 within chamber body 16 and at least partially surrounding chamber base member 30 positioned within the conventional chamber body 16. In other embodiments, as shown in FIGS. 4A-4F, chamber body 16 extends below at least an upper portion of said chamber base member 30 such that said chamber base member 30 is positioned along a lower outer surface 241 of said chamber body 16.

7. The development chamber 14 of embodiment 6, further comprising: a chamber lid 15, wherein said one or more inner wall surfaces 22 of said chamber body 16, an upper inner surface 224 of said chamber body 16, said base member upper surface 21 of said chamber base member 30, and said chamber lid 15 surround the chamber volume 25 of said development chamber 14. See, for example, FIG. 9.

8. The development chamber 14 of any one of embodiments 3 and 5 to 7, wherein said chamber base member 30 further comprises one or more positioning elements 26 along a lower base member surface 29 of said chamber base member 30, said one or more positioning elements 26 being engageable with one or more corresponding positioning elements 36 positioned along an upper inner surface 224 of said chamber body 16. See, for example, FIGS. 7-9.

9. The development chamber 14 of embodiment 8, wherein said one or more positioning elements 26 comprise a channel 26' extending along lower surface 29 of said chamber body 16. See again, FIGS. 7-9.

10. The development chamber 14 of embodiment 9, wherein said one or more corresponding positioning elements 36 comprise a bumper 28 positioned along upper inner surface 224 of said chamber body 16, said bumper 28 being sized to fit within channel 26' of said chamber body 16. See again, FIGS. 7-9.

11. The development chamber 14 of any one of embodiments 1 to 10, wherein said well 23 has a well length $W_L$, a well width $W_W$, and a well depth $W_D$, with the well length $W_L$ being greater than the well width $W_W$. See, for example, well dimensions shown in FIGS. 6A-6C.

12. The development chamber 14 of embodiment 11, wherein said well length $W_L$ ranges from about 1.0 centimeters (cm) to about 50 cm (or any value between 1.0 cm and 50 cm, including 1.0 cm and 50 cm, in increments of 0.1 cm, for example, 5.2 cm, or any range of values between 1.0 cm and 50 cm, including 1.0 cm and 50 cm, in increments of 0.1 cm, for example, from about 2.1 cm to about 2.8 cm), said well width $W_W$ ranges from about 0.8 cm to about 20 cm (or any value between 0.8 cm and 20 cm, including 0.8 cm and 20 cm, in increments of 0.1 cm, for example, 1.2 cm, or any range of values between 0.8 cm and 20 cm, including 0.8 cm and 20 cm, in increments of 0.1 cm, for example, from about 0.8 cm to about 1.8 cm), and said well depth $W_D$ ranges from about 0.5 cm to about 2.0 cm (or any value between 0.5 cm and 2.0 cm, including 0.5 cm and 2.0 cm, in increments of 0.1 cm, for example, 0.7 cm, or any range of values between 0.5 cm and 2.0 cm, including 0.5 cm and 2.0 cm, in increments of 0.1 cm, for example, from about 0.6 cm to about 0.8 cm).

13. The development chamber 14 of embodiment 11 or 12, wherein said well length $W_L$ is about 3.2 cm, said well width $W_W$ is about 1.2 cm, and said well depth $W_D$ is about 0.7 cm.

14. The development chamber 14 of any one of embodiments 11 to 13, wherein said well 23 has (i) a rear well wall 231 extending along said well length $W_L$, (ii) a front well wall 232 extending along said well length $W_L$ opposite said rear well wall 231, (iii) opposing side well walls 233/234 extending between said a rear well wall 231 and said front well wall 232, (iv) a bottom well wall 235 extending outward from said rear well wall 231 towards said front well wall 232, and (v) a front well wall extension 236 extending along said well length opposite said rear well wall 231 and downward from said front well wall 232 so as to intersect with said bottom well wall 235. See again, well 23 shown in FIGS. 4B-4F and 6A-6C.

15. The development chamber 14 of embodiment 14, wherein said rear well wall 231 is angularly configured relative to vertically extending line 238 (shown in FIG. 6B), forming an angle A with said a vertically extending line 238 with angle A being less than about 20° (or any value less than about 20°, including 20°, in increments of 0.1°, for example, 8.1°, or any range of values less than about 20°, including 20°, in increments of 0.1°, for example, from about 4.8° to about 10.4°. See, FIG. 6C.

16. The development chamber 14 of embodiment 15, wherein said angle A ranges from about 6.0 to about 12.0° (or any value between about 6.0° and 12.0°, including 6.0° and 12.0°, in increments of 0.1°, for example, 8.3°, or any range of values between about 6.0° and 12.0°, including 6.0° and 12.0° in increments of 0.1°, for example, from about 7.8° to about 9.0°).

17. The development chamber 14 of embodiment 5 or 16, wherein said angle A is about 8.1°.

18. The development chamber 14 of any one of embodiments 14 to 17, wherein said front well wall 232 is angularly configured relative to a horizontally extending line 239 (shown in FIG. 6C), forming an angle B with said horizontally extending line 239 with angle B being greater than about 15° (or any value greater than about 15°, including 15°, in increments of 0.1°, for example, 32.1°, or any range of values greater than about 15°, including 15°, in increments of 0.1°, for example, from about 18.3° to about 53.2). See, FIG. 6C.

19. The development chamber 14 of embodiment 18, wherein said angle B ranges from about 20.0° to about 45.0° (or any value between 20.0° and 45.0° including 20.0° and 45.0°, in increments of 0.1°, for example, 22.1°, or any range of values between 20.0° and 45.0° including 20.0° and 45.0°, in increments of 0.1°, for example, from about 30.3° to about 35.2).

20. The development chamber 14 of embodiment 18 or 19, wherein said angle B is about 33.7°.

21. The development chamber 14 of any one of embodiments 14 to 20, wherein said bottom well wall 235 has a bottom well wall width $B_W$ that is greater than a height $H_P$ of a TLC plate 11. See, FIG. 1 for TLC plate height $H_P$.

22. The development chamber 14 of embodiment 21, wherein said bottom well wall width $B_W$ ranges from about 0.12 cm to about 0.35 cm (or any value between 0.12 cm and 0.35 cm, including 0.12 cm and 0.35 cm, in increments of 0.01 cm, for example, 0.24 cm, or any range of values between 0.12 cm and 0.35 cm, including 0.12 cm and 0.35 cm, in increments of 0.01 cm, for example, from about 0.20 cm to about 0.25 cm).

23. The development chamber 14 of any one of embodiments 1 and 3 to 22, wherein said well 23 has a well volume $W_V$ of less than 10 cc (or any value less than 10.0 cc, including 10.0 cc, in increments of 0.1 cc, for example, less than 4.6 cc, or any range of values less than 10.0 cc, including 10.0 cc, in increments of 0.1 cc, for example, from about 3.4 cc to about 6.0 cc).

24. The development chamber 14 of any one of embodiments 1 and 3 to 23, wherein said well volume $W_V$ ranges from about 0.5 cc to about 8.0 cc (or any value between 0.5 cc and 8.0 cc, including 0.5 cc and 8.0 cc, in increments of 0.1 cc, for example, 7.8 cc, or any range of values between 0.5 cc and 8.0 cc, including 0.5 cc and 8.0 cc, in increments of 0.1 cc, for example, from about 0.8 cc to about 4.1 cc).

25. The development chamber 14 of any one of embodiments 1 and 3 to 24, wherein said well volume $W_V$ ranges from about 1.0 cc to about 5.0 cc.

26. The development chamber 14 of embodiment 2, wherein said well 23 has a maximum well cross-sectional area $W_A$ that is less than 80% (or any value less than 80%, including 80%, in increments of 0.1%, for example, about 10.2%, or any range of Values less than 80%, including 80%, in increments of 0.1%, for example, from about 10.4% to about 20.9%) of a maximum well cross-sectional area $W_A$ that is less than 80% of a maximum interior cross-sectional area of said chamber body 16 extending substantially parallel with an open end 124 of said chamber body 16.

27. The development chamber 14 of any one of embodiments 1 and 3 to 26, wherein said maximum well cross-sectional area $W_A$ is less than 50% (or any value less than 50%, including 50%, in increments of 0.1%, for example, about 18.2%, or any range of values less than 50%, including 50%, in increments of 0.1%, for example, from about 10.4% to about 20.9%) of a maximum interior cross-sectional area of said chamber body 16 extending substantially parallel with an open end 124 of said chamber body 16.

28. The development chamber 14 of any one of embodiments 1 and 3 to 26, wherein said maximum well cross-sectional area $W_A$ is less than 10% (or any value less than 10%, including 10%, in increments of 0.1%, for example, about 3.4%, or any range of values less than 10%, including 10%, in increments of 0.1%, for example, from about 2.4% to about 6.0%) of a maximum interior cross-sectional area of said chamber body 16 extending substantially parallel with an open end 124 of said chamber body 16.

29. The development chamber 14 of any one of embodiments 1 to 2 and 4 to 28, wherein said well 23 enables one or more TLC plates 11 to be supported therein so that each of the one or more TLC plates 11 does not come into contact with any of said one or more inner wall surfaces 22 of said chamber body 16.

30. The development chamber 14 of any one of embodiments 1 to 2, 4 and 11 to 29, wherein said base member upper surface 21 is surrounded by an upward-extending base wall 31, and a lower edge 161 of said chamber body 16 is sized and configured to fit within and along said upward-extending base wall 31 of said chamber base member 30.

31. The development chamber 14 of any one of embodiments 1 to 2, 4 and 11 to 30, wherein said development chamber 14 consists of (1) said chamber base member 30 and (2) said chamber body 16.

32. The development chamber 14 of any one of embodiments 3 and 5 to 31, wherein said development chamber 14 consists of (1) said chamber base member 30, (2) said chamber body 16, and optionally (3) a chamber lid 15.

33. The development chamber 14 of any one of embodiments 7 to 31, wherein said development chamber 14 consists of (1) said chamber base member 30, (2) said chamber body 16, and (3) said chamber lid 15.

34. A thin layer chromatography (TLC) assembly/kit 10 comprising the development chamber 14 of any one of embodiments 1 to 33.

35. The TLC assembly/kit 10 of embodiment 34, further comprising one or more TLC plates 11.

36. The TLC assembly/kit 10 of embodiment 34 or 35, further comprising one or more solvents 17.

37. The TLC assembly/kit 10 of any one of embodiments 34 to 36, further comprising one or more absorbent wipes, one or more plastic bags, or any combination thereof.

Methods of Making Development Chambers for Thin Layer Chromatography

38. A method of making the development chamber 14 of any one of embodiments 1 to 33, said method comprising: forming the chamber base member 30 having base member upper surface 21, wherein the base member upper surface 21 of the chamber base member 30 comprises a well 23 extending below and into the base member upper surface 21, the well 23 having well dimensions that (i) enable a bottom end 111 of a thin layer chromatography (TLC) plate 11 to be positioned therein, and (ii) house at least a portion of a mobile phase/solvent 17 when inputted into the well 23.

39. The method of embodiment 38, further comprising: forming a chamber body 16 that extends above the chamber base member 30 such that one or more inner wall surfaces 22 of the chamber body 16 and the base member upper surface 21 of the chamber base member 30 at least partially surround a chamber volume 25 of the development chamber 14.

Methods of Using Development Chambers for Thin Layer Chromatography

40. A method of using the development chamber 14 of any one of embodiments 1 to 33, said method comprising: positioning a thin layer chromatography (TLC) plate 11 within the well 23 of the chamber base member 30 so that the TLC plate 11 extends upward and out of the well 23.

41. The method of embodiment 40, further comprising: inputting a solvent 17 into the well 23 of the chamber base member 30.

42. The method of embodiment 40 or 41, further comprising: positioning a chamber body 16 over the chamber base member 30 and the TLC plate 11 so that one or more inner wall surfaces 22 of the chamber body 16 and the base member upper surface 21 of the chamber base member 30 at least partially surround a chamber volume 25 of the development chamber 14 and the TLC plate 11 positioned within the development chamber 14.

43. The method of embodiment 42, wherein the one or more inner wall surfaces 22 of the chamber body 16 and the base member upper surface 21 of the chamber base member 30 completely surround a chamber volume 25 of the development chamber 14 and the TLC plate 11 positioned within the reduced volume development chamber 14 except for one or more possible (i.e., optional) vent holes 141 extending through chamber body 16. See, for example, FIGS. 4A and 4C.

44. The method of any one of embodiments 40 to 42, further comprising: positioning the chamber base member 30 within a chamber body 16 so that one or more inner wall surfaces 22 of the chamber body 16 and the base member upper surface 21 of the chamber base member 30 at least partially surround a chamber volume 25 of the development chamber 14 and the TLC plate 11 positioned within the development chamber 14.

45. The method of embodiment 44, wherein said positioning the chamber base member 30 step comprises: aligning one or more positioning elements 26 along a lower base member surface 29 of the chamber base member 30 with one or more corresponding positioning elements 36 positioned along an upper inner surface 224 of said chamber body 16; and lowering the chamber base member 30 onto the one or more corresponding positioning elements 36.

46. The method of any one of embodiments 40 to 45, further comprising: placing a chamber lid 15 onto an upper edge 151 of the chamber body 16 so as to enclose the chamber volume 25 within the TLC plate 11 therein.

47. The method of any one of embodiments 40 to 46, wherein said method utilizes less than about 10 milliliters (ml) (or any value less than 10.0 ml, including 10.0 ml, in increments of 0.1 ml, for example, less than 2.8 ml, or any range of values less than 10.0 ml, including 10.0 ml, in increments of 0.1 ml, for example, from about 0.4 ml to about 3.0 ml) of solvent 17 for a thin layer chromatography (TLC) procedure (i.e., to at least partially fill well 23 of the chamber base member 30).

48. The method of any one of embodiments 40 to 47, wherein said method utilizes less than about 5.0 ml (or any value less than 5.0 ml, including 5.0 ml, in increments of 0.1 ml, for example, less than 2.6 ml, or any range of values less than 5.0 ml, including 5.0 ml, in increments of 0.1 ml, for example, from about 0.5 ml to about 1.0 ml) of solvent 17 for a thin layer chromatography (TLC) procedure to at least partially fill well 23 of the chamber base member 30).

The present invention is further illustrated by the following example, which is not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Example 1

Development chambers similar to exemplary development chambers 14 shown in FIGS. 4A-11 were made and utilized in thin layer chromatography processes.

In addition, it should be understood that although the above-described development chambers and methods are described as "comprising" one or more components or steps, the above-described development chambers and methods may "comprise," "consists of," or "consist essentially of" the above-described development chambers and methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a development chamber and/or method that "comprises" a list of elements (e.g., components or steps) is not necessarily limited to only those elements (or components or steps), but may include other elements (or components or steps) not expressly listed or inherent to the development chamber and/or method.

As used herein, the transitional phrases "consists of" and "consisting of" exclude any element, step, or component not specified. For example, "consists of" or "consisting of" used in a claim would limit the claim to the components, materials or method steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a development chamber and/or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described development chambers and/or methods may comprise, consist essentially of, or consist of any of the herein-described components, method steps, and/or features, as shown in the figures with or without any feature(s) not shown in the figures. In other words, in some embodiments, the development chambers and/or methods of the present invention do not have any additional features other than those shown in the figures, and such additional features, not shown in the figures, are specifically excluded from the development chambers and/or methods. In other embodiments, the development chambers and/or methods of the present invention do have one or more additional features that are not shown in the figures.

The present invention is described above and further illustrated below by way of claims, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

What is claimed is:

1. A development chamber (14) comprising:
    a chamber base member (30) having a base member upper surface (21); and
    a chamber body (16) that extends above said chamber base member (30) such that one or more inner wall surfaces (22) of said chamber body (16) and said base member upper surface (21) of said chamber base member (30) at least partially surround a chamber volume (25) of said development chamber (14),
    wherein said base member upper surface (21) of said chamber base member (30) comprises a well (23) extending below and into said base member upper surface (21), said well (23) having (a) well dimensions that (i) enable a bottom end (111) of a thin layer chromatography (TLC) plate (11) to be positioned therein, and (ii) house at least a portion of a mobile phase/solvent (17) when inputted into said well (23), and (b) a maximum well cross-sectional area ($W_A$) that is less than 80% of a maximum interior cross-sectional area of said chamber body (16) extending substantially parallel with an open end (124) of said chamber body (16),
    wherein said well (23) has a well length ($W_L$), a well width ($W_W$), and a well depth ($W_D$), with the well length ($W_L$) being greater than the well width ($W_W$); and wherein said well length ($W_L$) ranges from about 1.0 centimeters (cm) to about 50 cm, said well width ($W_W$) ranges from about 0.8 cm to about 20 cm, and said well depth ($W_D$) ranges from about 0.5 cm to about 2.0 cm, and
    wherein said well (23) has (i) a rear well wall (231) extending along said well length ($W_L$), (ii) a front well wall (232) extending along said well length ($W_L$) opposite said rear well wall (231), (iii) opposing side well walls (233)/(234) extending between said rear well wall (231) and said front well wall (232), (iv) a bottom well wall (235) extending outward from said rear well wall (231) towards said front well wall (232), and (v) a front well wall extension (236) extending along said well length ($W_L$) opposite said rear well wall (231) and downward from said front well wall (232) so as to intersect with said bottom well wall (235).

2. A development chamber (14) comprising:
    a chamber base member (30) having a base member upper surface (21); and
    a chamber body (16) that extends above said chamber base member (30) such that one or more inner wall surfaces (22) of said chamber body (16) and said base member upper surface (21) of said chamber base member (30) at least partially surround a chamber volume (25) of said development chamber (14),
    wherein said base member upper surface (21) of said chamber base member (30) comprises a well (23)

extending below and into said base member upper surface (21), said well (23) having (a) well dimensions that (i) enable a bottom end (111) of a thin layer chromatography (TLC) plate (11) to be positioned therein, and (ii) house at least a portion of a mobile phase/solvent (17) when inputted into said well (23), and (b) a well volume ($W_V$) of less than 10.0 cubic centimeters (cc), and wherein said well (23) has a well length ($W_L$), a well width ($W_W$), and a well depth ($W_D$), with the well length ($W_L$) being greater than the well width ($W_W$); and wherein said well (23) has (i) a rear well wall (231) extending along said well length ($W_L$), (ii) a front well wall (232) extending along said well length ($W_L$) opposite said rear well wall (231), (iii) opposing side well walls (233)/(234) extending between said a rear well wall (231) and said front well wall (232), (iv) a bottom well wall (235) extending outward from said rear well wall (231) towards said front well wall (232), and (v) a front well wall extension (236) extending along said well length ($W_L$) opposite said rear well wall (231) and downward from said front well wall (232) so as to intersect with said bottom well wall (235).

3. A development chamber (14) comprising:

a chamber base member (30) having a base member upper surface (21), wherein said base member upper surface (21) of said chamber base member (30) comprises a well (23) extending below and into said base member upper surface (21), said well (23) having (a) well dimensions that (i) enable a bottom end (111) of a thin layer chromatography (TLC) plate (11) to be positioned therein, and (ii) house at least a portion of a mobile phase/solvent (17) when inputted into said well (23), and (b) a maximum well cross-sectional area ($W_A$) that is less than 80% of a maximum interior cross-sectional area of a chamber body (16) at an open end (124) of the chamber body (16), the chamber body (16) sized to extend above the chamber base member (30) such that one or more inner wall surfaces (22) of the chamber body (16) and the base member upper surface (21) of the chamber base member (30) at least partially surround a chamber volume (25) of the development chamber (14) when used in combination, wherein said well (23) has a well length ($W_L$), a well width ($W_W$), and a well depth ($W_D$), with the well length ($W_L$) being greater than the well width ($W_W$); and wherein said well (23) has (i) a rear well wall (231) extending along said well length ($W_L$), (ii) a front well wall (232) extending along said well length ($W_L$) opposite said rear well wall (231), (iii) opposing side well walls (233)/(234) extending between said a rear well wall (231) and said front well wall (232), (iv) a bottom well wall (235) extending outward from said rear well wall (231) towards said front well wall (232), and (v) a front well wall extension (236) extending along said well length ($W_L$) opposite said rear well wall (231) and downward from said front well wall (232) so as to intersect with said bottom well wall (235).

4. The development chamber (14) of claim 1, wherein said one or more inner wall surfaces (22) of said chamber body (16) and said base member upper surface (21) of said chamber base member (30) completely surround said chamber volume (25) of said development chamber (14) except for one or more optional vent holes (141), when present, extending through said chamber body (16).

5. The development chamber (14) of claim 3, wherein said chamber body (16) extends above said chamber base member (30) such that said one or more inner wall surfaces (22) of said chamber body (16) and said base member upper surface (21) of said chamber base member (30) at least partially surround said chamber volume (25) of said development chamber (14).

6. The development chamber (14) of claim 5, wherein said chamber body (16) also extends below at least a portion of said chamber base member (30).

7. The development chamber (14) of claim 1, wherein said rear well wall (231) is angularly configured relative to a vertically extending line (238), forming an angle (A) with said vertically extending line (238) with angle (A) being less than about 20°.

8. The development chamber (14) of claim 7, wherein said angle (A) ranges from about 6.0 to about 12.0°.

9. The development chamber (14) of claim 8, wherein said front well wall (232) is angularly configured relative to a horizontally extending line (239), forming an angle (B) with said horizontally extending line (239) with angle (B) being greater than about 15°.

10. The development chamber (14) of claim 9, wherein said angle (B) ranges from about 20.0° to about 45.0°.

11. The development chamber (14) of claim 10, wherein said bottom well wall (235) has a bottom well wall width ($B_W$) that is greater than a height ($H_P$) of the TLC plate (11).

12. The development chamber (14) of claim 11, wherein said bottom well wall width ($B_W$) ranges from about 0.12 cm to about 0.35 cm.

13. The development chamber (14) of claim 1, wherein said well (23) has a well volume ($W_V$) of less than 10 cc.

14. The development chamber (14) of claim 13, wherein said well volume ($W_V$) ranges from about 0.5 cc to about 8.0 cc.

15. The development chamber (14) of claim 1, wherein said maximum well cross-sectional area ($W_A$) is less than 50% of a maximum interior cross-sectional area of said chamber body (16) extending substantially parallel with said open end (124) of said chamber body (16).

16. The development chamber (14) of claim 15, wherein said maximum well cross-sectional area ($W_A$) is less than 10% of said maximum interior cross-sectional area of said chamber body (16) extending substantially parallel with said open end (124) of said chamber body (16).

17. The development chamber (14) of claim 1, wherein said well (23) enables the TLC plate (11) to be supported therein so that the TLC plate (11) does not come into contact with any of said one or more inner wall surfaces (22) of said chamber body (16).

18. The development chamber (14) of claim 1, wherein said base member upper surface (21) is surrounded by an upward-extending base wall (31), and a lower edge (161) of said chamber body (16) is sized and configured to fit within and along said upward-extending base wall (31) of said chamber base member (30).

19. The development chamber (14) of claim 1, wherein said development chamber (14) consists of (1) said chamber base member (30) and (2) said chamber body (16).

20. The development chamber (14) of claim 3, wherein said development chamber (14) consists of (1) said chamber base member (30), and (2) said chamber body (16).

21. A thin layer chromatography (TLC) assembly/kit (10) comprising the development chamber (14) of claim 1, and one or more of: (i) said TLC plate (11), (ii) said mobile phase/solvent (17), (iii) one or more absorbent wipes, (iv) one or more plastic bags, or (v) any combination of (i) to (iv).

22. A method of making the development chamber (14) of claim 1, said method comprising:
forming the chamber base member (30) having said base member upper surface (21), wherein the base member upper surface (21) of the chamber base member (30) comprises said well (23) extending below and into the base member upper surface (21), the well (23) having well dimensions that (i) enable said bottom end (111) of said thin layer chromatography (TLC) plate (11) to be positioned therein, and (ii) house at least a portion of said mobile phase/solvent (17) when inputted into the well (23).

23. The method of claim 22, further comprising:
forming said chamber body (16) that extends above the chamber base member (30) such that said one or more inner wall surfaces (22) of the chamber body (16) and the base member upper surface (21) of the chamber base member (30) at least partially surround said chamber volume (25) of the development chamber (14).

24. A method of using the development chamber (14) of claim 1, said method comprising:
positioning said thin layer chromatography (TLC) plate (11) within the well (23) of the chamber base member (30) so that the TLC plate (11) extends upward and out of the well (23).

25. The method of claim 24, further comprising one or more of:
inputting said mobile phase/solvent (17) into the well (23) of the chamber base member (30); and
positioning said chamber body (16) over the chamber base member (30) and the TLC plate (11) so that said one or more inner wall surfaces (22) of the chamber body (16) and the base member upper surface (21) of the chamber base member (30) at least partially surround said chamber volume (25) of the development chamber (14) and the TLC plate (11) positioned within the development chamber (14).

26. The method of claim 25, wherein the one or more inner wall surfaces (22) of the chamber body (16) and the base member upper surface (21) of the chamber base member (30) completely surround said chamber volume (25) of the development chamber (14) and the TLC plate (11) positioned within the chamber volume (25) of the development chamber (14) except for one or more optional vent holes (141), when present, extending through chamber body (16).

27. The method of claim 25, further comprising:
positioning the chamber base member (30) within said chamber body (16) so that said one or more inner wall surfaces (22) of the chamber body (16) and the base member upper surface (21) of the chamber base member (30) at least partially surround said chamber volume (25) of the development chamber (14) and the TLC plate (11) positioned within the development chamber (14).

28. The method of claim 25, wherein said method utilizes less than about 10 milliliters (ml) of said mobile phase/solvent (17) for a thin layer chromatography (TLC) procedure.

29. The method of claim 25, wherein said method utilizes less than about 5.0 ml of said mobile phase/solvent (17) for a thin layer chromatography (TLC) procedure.

30. The development chamber (14) of claim 3, wherein said rear well wall (231) is angularly configured relative to a vertically extending line (238), forming an angle (A) with said vertically extending line (238) with angle (A) being less than about 20°.

31. The development chamber (14) of claim 30, wherein said front well wall (232) is angularly configured relative to a horizontally extending line (239), forming an angle (B) with said horizontally extending line (239) with angle (B) being greater than about 15°.

32. The development chamber (14) of claim 31, wherein said angle (A) ranges from about 6.0 to about 12.0°, and said angle (B) ranges from about 20.0° to about 45.0°.

33. The development chamber (14) of claim 32, wherein said well length ($W_L$) ranges from about 1.0 cm to about 50 cm, said well width ($W_W$) ranges from about 0.8 cm to about 20 cm, said well depth ($W_D$) ranges from about 0.5 cm to about 2.0 cm, and said bottom well wall (235) has a bottom well wall width ($B_W$) (i) that is greater than a height ($H_P$) of the TLC plate (11), and (ii) ranges from about 0.12 cm to about 0.35 cm.

34. The development chamber (14) of claim 2, wherein (i) said rear well wall (231) is angularly configured relative to a vertically extending line (238), forming an angle (A) with said vertically extending line (238) with angle (A) being less than about 20°, and (ii) said front well wall (232) is angularly configured relative to a horizontally extending line (239), forming an angle (B) with said horizontally extending line (239) with angle (B) being greater than about 15°.

35. A method of using the development chamber (14) of claim 2, said method comprising:
positioning said thin layer chromatography (TLC) plate (11) within the well (23) of the chamber base member (30) so that the TLC plate (11) extends upward and out of the well (23).

36. A method of using the development chamber (14) of claim 3, said method comprising:
positioning said thin layer chromatography (TLC) plate (11) within the well (23) of the chamber base member (30) so that the TLC plate (11) extends upward and out of the well (23).

37. A thin layer chromatography (TLC) assembly/kit (10) comprising the development chamber (14) of claim 2, and one or more of: (i) said TLC plate (11), (ii) one or more solvents (17), (iii) one or more absorbent wipes, (iv) one or more plastic bags, or (v) any combination of (i) to (iv).

38. A thin layer chromatography (TLC) assembly/kit (10) comprising the development chamber (14) of claim 3, and one or more of: (i) said TLC plate (11), (ii) one or more solvents (17), (iii) one or more absorbent wipes, (iv) one or more plastic bags, or (v) any combination of (i) to (iv).

* * * * *